(12) United States Patent
Gibson

(10) Patent No.: US 6,925,613 B2
(45) Date of Patent: Aug. 2, 2005

(54) STROBE READING TECHNOLOGY AND DEVICE

(75) Inventor: Jim Gibson, 1608 Greenleaf La., Charlottesville, VA (US) 22903

(73) Assignee: Jim Gibson, Charlottesville, VA (US)

( * ) Notice: Subject to any disclaimer, the term of this patent is extended or adjusted under 35 U.S.C. 154(b) by 702 days.

(21) Appl. No.: 10/082,748

(22) Filed: Feb. 21, 2002

(65) Prior Publication Data

US 2003/0043196 A1 Mar. 6, 2003

Related U.S. Application Data

(60) Provisional application No. 60/316,056, filed on Aug. 30, 2001, and provisional application No. 60/341,373, filed on Dec. 17, 2001.

(51) Int. Cl.[7] .................................................. G09G 5/00
(52) U.S. Cl. ..................... 715/864; 715/513; 715/517; 715/531; 715/776; 715/518; 715/519; 715/865; 715/784; 715/785; 715/901; 434/180; 434/317
(58) Field of Search ................................ 715/776, 518, 715/517, 613, 531, 519, 864, 865, 784, 785, 901; 434/180, 317

(56) References Cited

U.S. PATENT DOCUMENTS

| 4,159,417 | A | | 6/1979 | Rubincam |
| 5,339,091 | A | | 8/1994 | Yamazaki |
| 5,438,344 | A | | 8/1995 | Oliva |
| 5,467,102 | A | | 11/1995 | Kuno |
| 5,475,398 | A | | 12/1995 | Yamazaki |
| 5,475,399 | A | | 12/1995 | Borsuk |
| 5,873,109 | A | * | 2/1999 | High ........................ 715/517 |
| 6,098,085 | A | * | 8/2000 | Blonder et al. ............ 715/531 |

* cited by examiner

Primary Examiner—Ba Huynh
Assistant Examiner—Sara Hanne
(74) Attorney, Agent, or Firm—Jagtiani + Guttag

(57) ABSTRACT

A method and device for displaying electronic text on a screen is disclosed, comprising presenting text as a single word display of a particular duration plus a non-text gap, and continuing this single word duration plus gap presentation until all desired text has been sequentially displayed; wherein the speed of the text display is created by repetition of the duration plus gap, and wherein varying the gap relative to the duration creates a different flow of text presentation. The speed of the display is controllable by the reader using a control pad. This method and device permits text to be easily read on a limited viewing area.

38 Claims, 10 Drawing Sheets

Display timing illustrations

Timing Structure for Very Fast Display
D = 50% G = 50%

Timing Structure for Normal Display
D = 66.6% G = 33.3%

Timing Structure for Very Slow Display
D = 90% G = 10%

Software elements of the Strobe Reading Device, and their interaction

Hardware elements of the Strobe Reading Device, and their interaction

Display timing illustrations

Timing Structure for Very Fast Display
D = 50%  G = 50%

Timing Structure for Normal Display
D = 66.6%  G = 33.3%

Timing Structure for Very Slow Display
D = 90%  G = 10%

STROBE READING TECHNOLOGY AND DEVICE

This application claims priority to U.S. provisional application No. 60/316,056 filed Aug. 30, 2001 and U.S. provisional application No. 60/341,373 filed Dec. 17, 2001, the contents of which are incorporated herein as though recited in full.

FIELD OF THE INVENTION

The present invention relates to the field of electronic books and the control of text associated with these books and, particularly, the invention deals with hand-held electronic books with optimized text presentation, enhanced user control over the flow of text, smaller size for easier storage and transport, and easier capability for the user to place bookmarks, review footnotes and find specific text locations.

DESCRIPTION OF THE PRIOR ART

Written information has been conveyed in a variety of ways, ranging from pictographs and petroglyphs to simple clay tablets with impressions all the way up to complex programming languages stored on electronic media and running in the background of today's modem computers. Regardless of the technology involved, a common theme emerges: at some point the user reads sequentially arranged symbols.

When reading a document, the user scans the text or symbols in the appropriate direction. A significant amount of space exists between words or symbols; this space is usually blank space or "white space" and is the same throughout the document. Thus the user's eyes provide direction and flow for reading the document, essentially serving as the tracking mechanism. Unless words and symbols are arranged optimally, the user may frequently skip words or lose their place in the document, necessitating a back-track to the proper place and a reduced efficiency of reading. This loss of place can cause a decrease in reading comprehension and can be particularly bad in cases of learning disabilities.

Reviewing the traditional mechanics of reading shows that the process is in many ways not ideal. An optimal line length exists for reading text which research has shown to be between ten to twelve words. This is determined by the way reader's eyes "bounce" across and down the lines of text and the page. Most readers pause several times as they read a line of text, comprehending clusters of words. Even very fast readers may pause a few times as they read lines of text. All of the eye movement required can cause the user to lose their place, thereby slowing comprehension.

Unless the words per line in a document and the space between lines is optimized, the user may run into the various difficulties described above. Numerous studies have identified optimal conditions for reading comprehension but many books, magazines and even computerized materials do not incorporate these findings in to their format. A form of text presentation called dynamic text presentation has been developed which changes the static nature of text in documents. In this method, an attempt is made to optimize reading by using some of the special capabilities of a computer. Two methods of dynamic text presentation have been tested, rapid serial visual presentation (RSVP) and the Times Square format. Both types limit the number of words presented to the reader and reduce the eye movement that is normal to reading paginated text.

Advances in computer and communication technology have provided consumers with convenient and economical means to access information in a variety of media. One particular means of access is electronic books. An electronic book is a viewing device that receives printed materials in the form of stored digital data or data downloaded from an information network. Electronic books commonly are comprised of a display, a memory device, a power system and user control functions. Depending on the memory device, some electronic books are further provided with a communications system. The user can read the downloaded or external memory-stored books and printed materials at their own convenience without the need to purchase printed copies. Devices of this general nature are known in the art. For example, U.S. Pat. No. 4,159,417 to Rubincam, U.S. Pat. No. 5,339,091 to Yamazaki et al, U.S. Pat. No. 5,438,344 to Oliva, U.S. Pat. No. 5,467,102 to Kuno et al, U.S. Pat. No. 5,475,398 to Yamazaki et al, and U.S. Pat. No. 5,475,399 to Borsuk teach portable reading devices. In each of the above patents, text information is stored on a suitable storage medium, such as a conventional Compact Disc (CD). A microprocessor controlled system reads text information from the storage medium and displays the information on a display screen to be read by a user. A common aspect to each of these inventions is the size of the device and the delivery of paginated text. These devices resemble books in their size and page structure; some of them even provide the reader with two pages at a time. Although the user has control over movement of the electronic pages, the text flow is not optimized and the cognitive and tracking problems described above are not addressed. Borsuk in the '399 patent tries to address some user issues by permitting the user to set the size of type but does not address tracking or other cognitive issues. Furthermore, because these devices are generally large devices, they have substantial limits to their portability.

SUMMARY OF THE INVENTION

These and other disadvantages and limitations of the prior art are overcome by the present invention. The invention is a method, Strobe Reading Technology, and device, the Strobe Reading Device, for reducing the size of an electronic book, reducing the display to a single word of text and increasing the user's capability to set the rate of reading. Furthermore, bookmarking or place holding and reviewing footnotes is improved. These improvements provide increased comprehension, reduced eye fatigue and improved portability.

DETAILED DESCRIPTION OF THE INVENTION

The present invention provides a small-sized, portable, hand-held reading device and technique with improved ruggedness and usability features. It reduces the overall screen size such that a single word of text is viewed and the user is provided with a control pad that allows him or her to establish a personal pace for viewing the text.

Instead of long lines or pages of text, Strobe Reading Technology (hereinafter SRT) presents text one word at a time, sequentially and centered on exactly the same spot of the display screen. The user controls the speed of the text presentation. The effect is of words flashing in a single location similar to the flash of a strobe light. While presenting text one word at a time is preferred and therefore primarily discussed herein, the present invention also encompasses presenting multi-word phrases in a single display.

Figure 16:
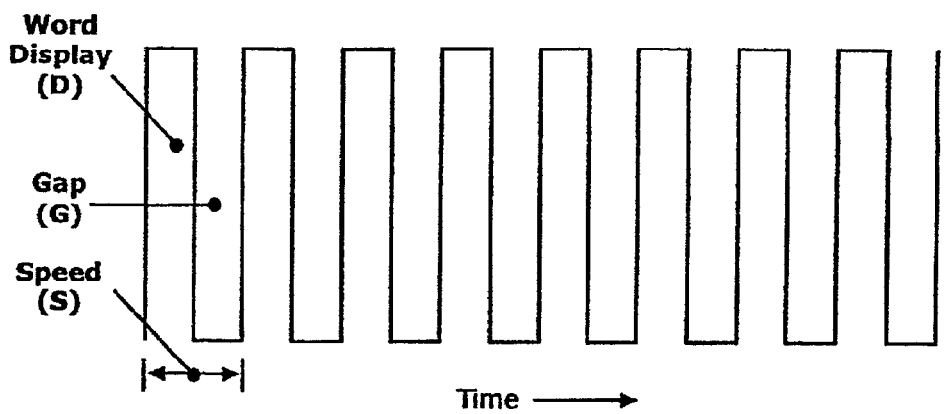
FIG. 16 is a graphic depiction of SRD display timing, showing the relationship between word display duration (D) and blank screen gap (G) at different reading speeds.
Figure 16:
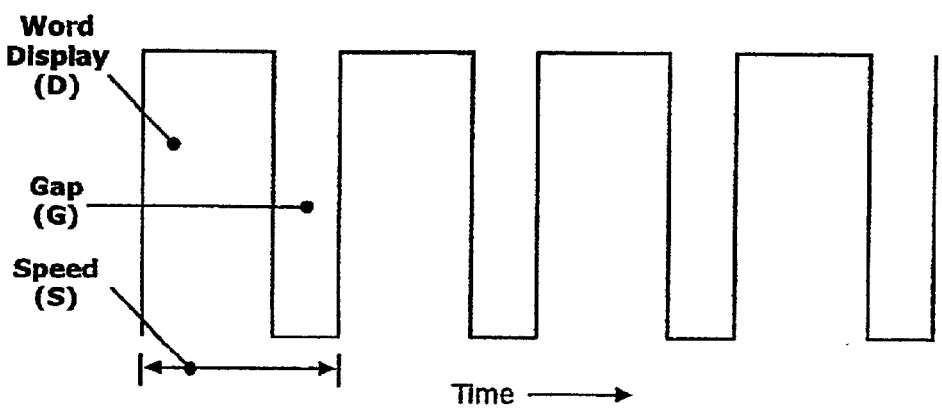
Figure 16:
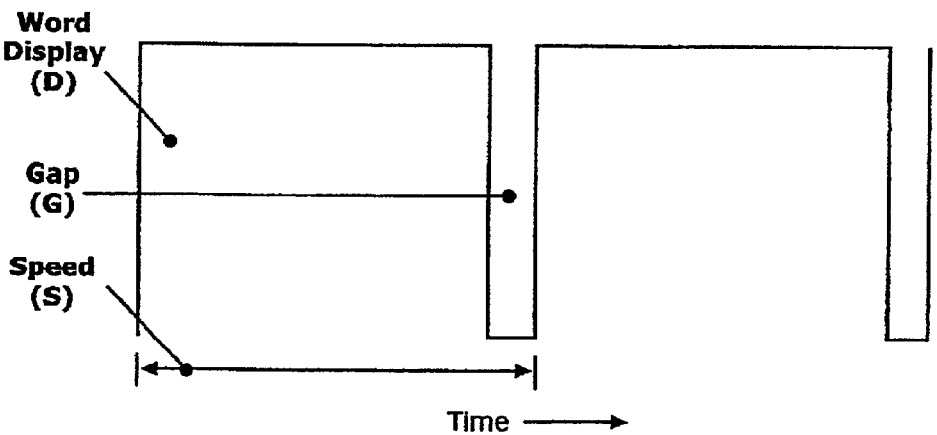

The timing structure of the display of text is critical to the effective functioning of SRT. That structure is shown in FIG. 16. Each word displays on screen for a duration (D), which is then followed by a gap (G) where the screen is cleared and displays no text. The total time of D+G is the speed (S) which is user-controllable at all times.

The blank gap between word displays is crucial to effective strobe text presentation. If it is not present the words blur together and become unreadable. Varying the length of G relative to D creates a different "feel" to the text presentation. When G is shorter and D longer, the presentation feels smoother but it is more difficult to parse. As G becomes longer and D shorter, the text presentation feels choppier but is easier to parse.

Given that D+G=S, the optimal, and therefore default, duration of G relative to D is defined by the following formula: G=S−(S/x), wherein to get the optimal duration of G, x is about 1.5, wherein "about" means plus or minus 10%. This duration is used in the preferred embodiment.

This optimal timing structure displays the word 66.6% of the time and the gap 33.3% of the time. As speed increases—or more words are displayed per minute—a longer gap is required for comprehension, and as speed decreases—or fewer words are displayed per minute—a shorter gap is required. At slow speeds the percentage split between D and G can be as high as 90/10. At very high speeds the optimal percentage split between D and G is 50/50. SRT uses an algorithm to vary the duration of G relative to D along this curve as the user varies the speed of text display. The whole curve can be moved according to user preference (smoother/choppier) through a settings panel.

Cues embedded into text documents to aid in reader comprehension, such as punctuation marks and spaces between words, are used by SRT to shape the timing of the presentation or strobe effect such that the reading flow reflects natural speech patterns. Spaces define individual words and a comma becomes a pause in the timing of the display. A period becomes a longer pause in the display and paragraphs longer still. In particular, the pauses are defined as follows:

If D=the duration each individual word is displayed, and
If G=the duration of the gap after each word, and
If S (speed)=D+G,
2S=additional pause after commas, semicolons, colons
3S=additional pause after periods, question marks, exclamation marks
4S=additional pause at paragraph breaks This timing structure gives the most natural word flow.

Other text cues need special treatment in Strobe Reading. In text for example, dashes are used to place special emphasis on a component when commas are too weak to serve that purpose. Two dashes can be used mid sentence to set off a phrase from the rest of a sentence or one dash can be used to attach material to the end of a sentence when there is a clear break in the continuity of the sentence. Two dashes used to set off appositive phrases are handled like parenthesis and quotation marks as discussed below. If only one dash is detected in a sentence, the pause is equivalent to a comma pause (2S).

SRT can also distinguish between periods at the end of a sentence and periods used in abbreviations. Sentence periods are followed by a 3S pause while periods after an abbreviation are not followed by any additional pause. SRT makes these distinctions by referencing a library of abbreviations that it recognizes as such.

When SRT identifies text which is underscored, italicized or otherwise set off from the normal text, it recognizes this as a style element used for emphasis and it slows the presentation of the text by an appropriate rate, preferably by one third of the normal rate.

SRT bypasses the major disadvantages of the traditional presentation of text, whether in standard or electronic book form. The large amount of eye movement used in other written materials and electronic books is eliminated because SRT allows the user to focus the eyes on a single spot instead of tracking word by word and line by line. Thus tracking problems are completely eliminated. Also, because the user controls the speed of presentation, the text can be better controlled to match the comprehension and reading speed of the user.

Testing of the Strobe Reading Device (hereinafter SRD) and studies using dynamic text presentation such as rapid serial visual presentation have shown that readers can perform as efficiently with this style as with normal page format reading. In some cases, reading speed increases with no loss of comprehension. Furthermore, this style is particularly useful when display space is limited, when scanning or skimming is performed, when the user has impaired peripheral vision, with certain types of poor readers and as a more efficient way of presenting text because there is no need to expend cognitive capacity in controlling eye movements.

The second element of the invention is the Strobe Reading Device itself This device is the optimized hardware for presenting text using SRT. Accordingly, an aspect of the present invention provides a highly portable, lightweight electronic reading device for reading text information in the form of documents, books, etc. previously stored on a storage medium. The SRD generally comprises a housing, a display screen, a control panel, a power source, and a memory device. The display screen displays text information of a document being read using the SRT format along with such system control data as is necessary during the use of the device. The control panel allows the user to control the speed of display of information on the monitor including selection of a document to be read, moving to a desired page, "bookmarking" a desired text location to allow the user to rapidly return to that location at a later time, and stepping forward and backward through a document rapidly. The memory device, which is either a fixed internal hard drive or removable media such as the Sony Memory Stick or flash memory cards similar to those used in MP3 players and digital cameras, is provided to read text information for display on the display screen. The display screen, control panel, and memory device are contained within a housing that is designed to be compact, highly mobile and rugged. A preferred size of the SRD is five inches in length by one and three-quarters inches in height. This size makes the SRD easy to carry in a pocket or attach to a key chain. The design facilitates ease of use and comfort of the user over extended periods of use, and can protect the various components from damage due to impact or contamination from foreign materials such as dust and sand.

Figure 1:
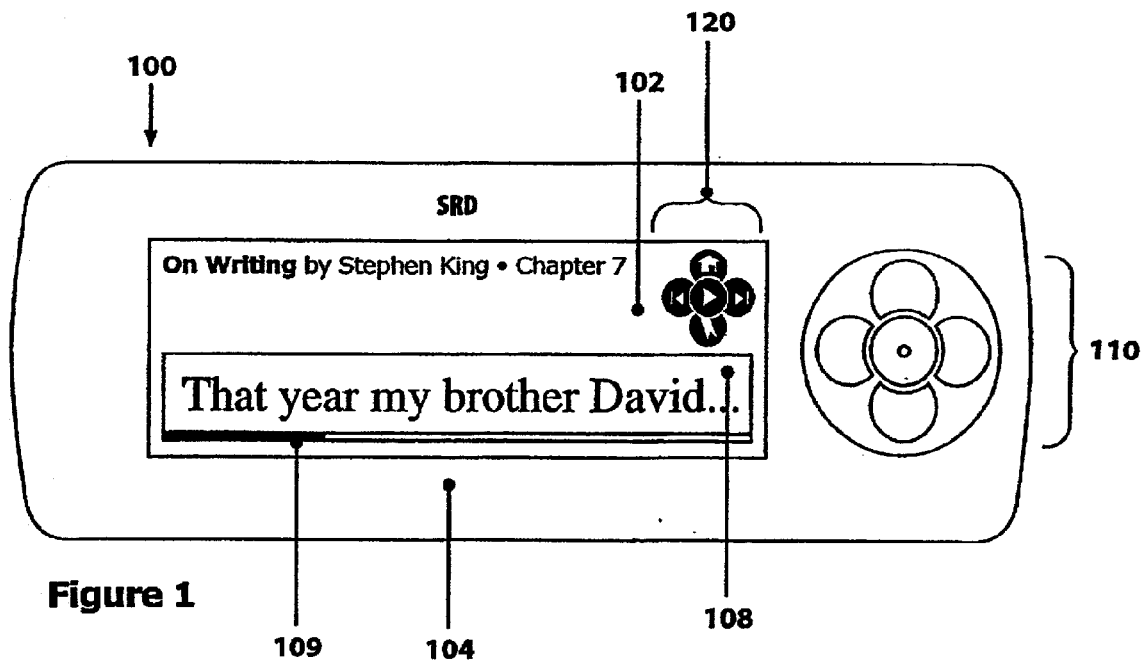
FIG. 1 shows a facing view of the Strobe Reading Device in the Reading Mode with text queued to begin strobe text flow.
Figure 3:
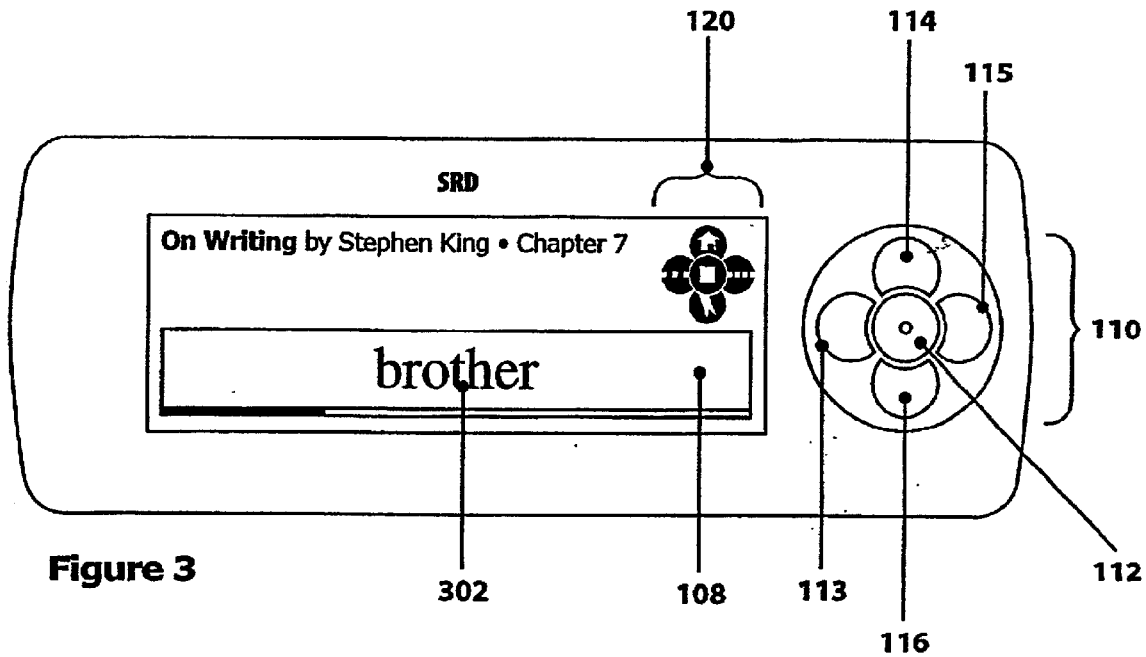
FIG. 3 shows a facing view of the SRD having a "rosette" control pad with Strobe text flow presenting words one at a time in the same spot.
Figure 4:
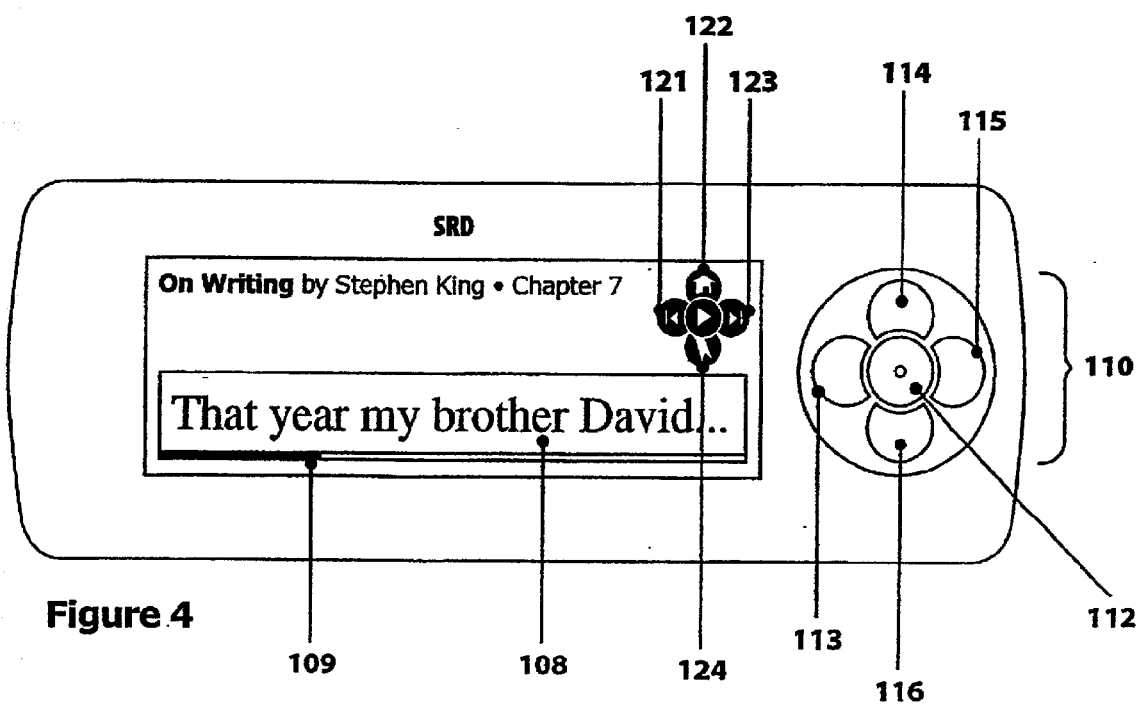
FIG. 4 shows a facing view of the SRD having an on-screen proxy corresponding to the control pad.
Figure 5:
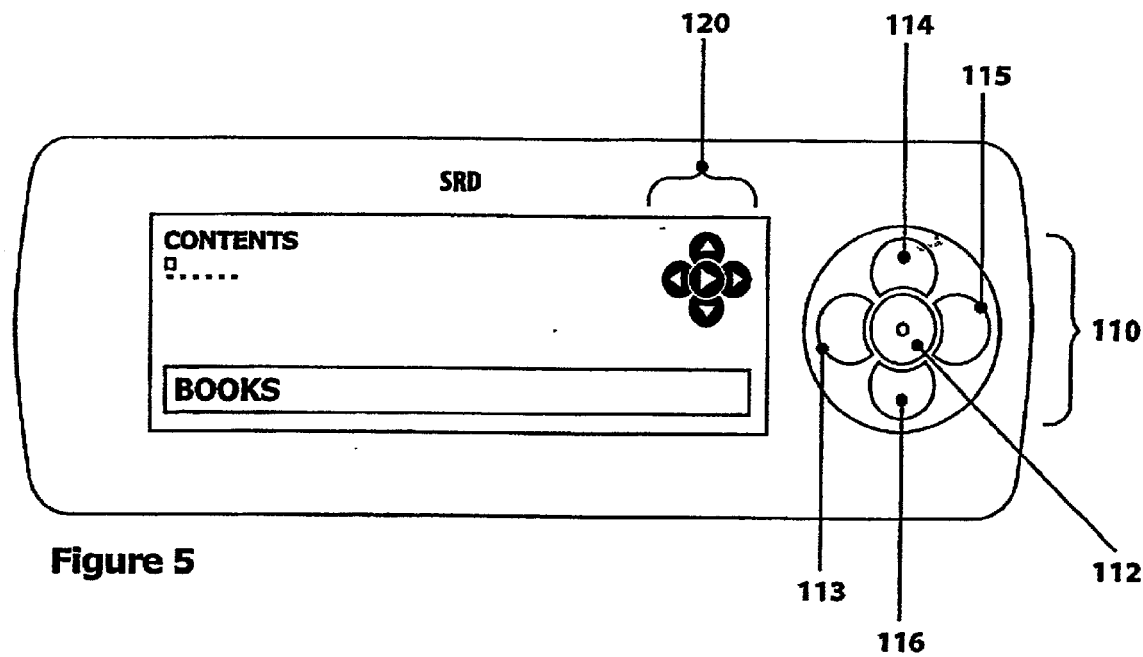
FIG. 5 shows a facing view of the SRD and on-screen proxy in the contents mode.
Figure 6:
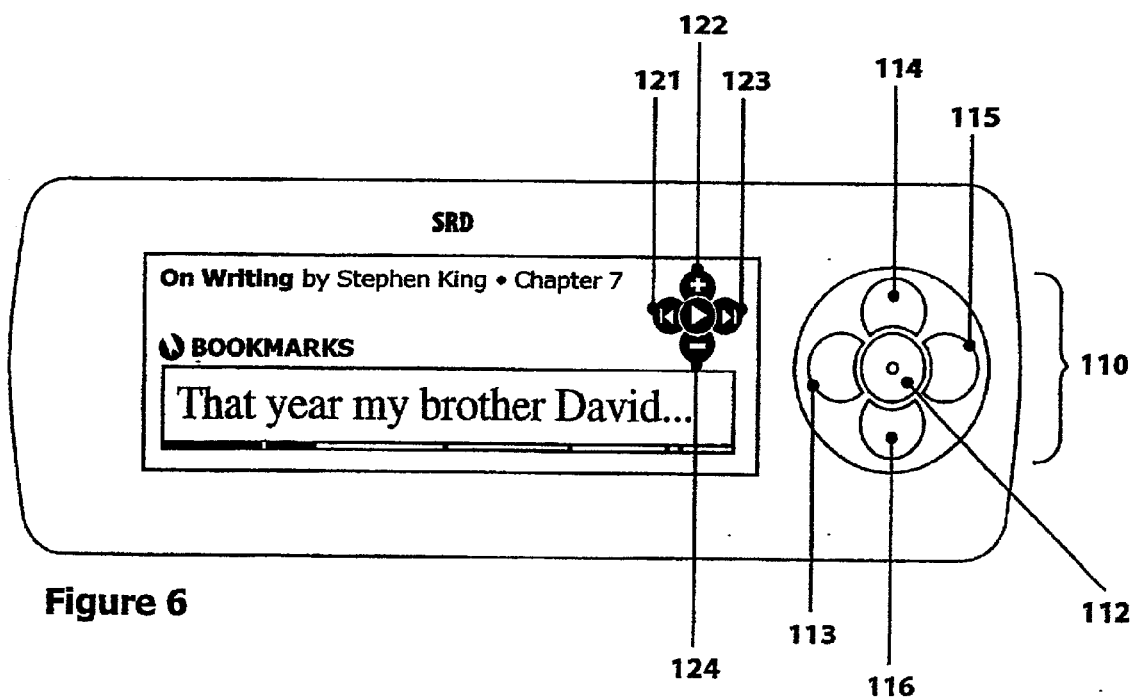
FIG. 6 shows a facing view of the SRD and on-screen proxy in the bookmarks mode.
Figure 7:
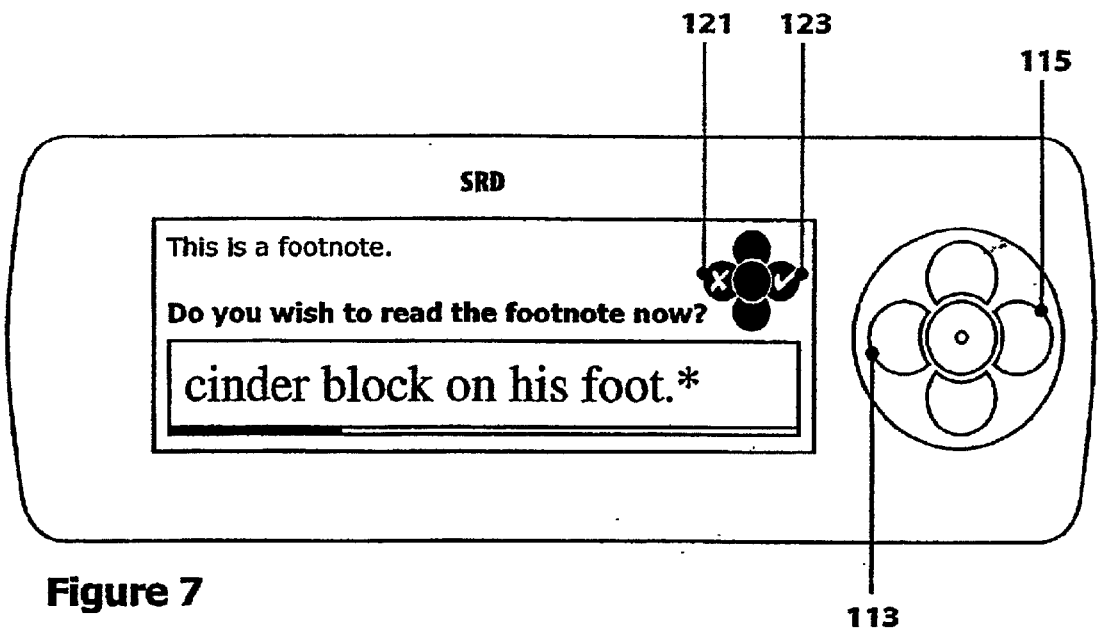
FIG. 7 shows a facing view of the SRD and on-screen proxy in the footnotes mode.

FIG. 1 shows a preferred embodiment of the SRD. The SRD 100 contains a screen 102 such as the LED style screen found commonly in electronic devices and a housing 104 with a control pad 110 arranged on the right side. The control pad 110 controls text flow and navigation and can be of a variety of configurations. The control pad 110 preferably is composed of a button pad of a rosette configuration and has a corresponding on-screen proxy 120 of the button pad that shows the function of every button in each mode. In the preferred embodiment shown in FIG. 3, middle button 112 starts and stops text flow, top button 114 stops text flow and goes to the contents, bottom button 116 stops text flow and goes to the bookmark function, left button 113 slows text flow down, and right button 115 speeds text flow up. Changes in speed replace the on-screen proxy 120 with a speedometer for a second or two. When the display is stopped, the proxy 120 changes slightly as shown in FIG. 4. Here, the left icon 121 and right icon 123 indicate that the corresponding buttons 113 and 115 on button pad 110 will go backward and forward respectively sentence-by-sentence. The top icon 122 and corresponding button 114 remain the entrance to the contents while the bottom icon 124 and corresponding button 116 remain the entrance to the bookmark function. The on-screen proxy 120 also changes slightly when the SRT is in contents mode, bookmark mode, and footnote mode as shown in FIGS. 5, 6, and 7 respectively. While the above description and figures disclose an SRD for right-handed use, the button mapping and display orientation can be modified through a user settings panel to accommodate left-handed users.

Using these buttons to control the SRD is easy and intuitive and can be learned in minutes. These simple controls provide all the tools needed for operation of the SRD modes—Contents and Reading—which include bookmarks and footnotes.

When the user enters the Reading mode, text is in a queued state, ready to begin strobe text flow. Whenever the SRD is in a stopped state in the Reading mode, it shows as much text as will fit in the text display box 108. This aids the user in getting and staying oriented within the text.

From the queued state, the reading environment is completely controlled by the button pad 110 as shown in FIG. 4. A click on the center button of the button pad 112 starts the text flowing. Every time text flow starts, the first few seconds represents an ease-in period where the text flow ramps up to the speed last used on the device. Once text is flowing, a single click on the right button 115 of the button pad 110 speeds text flow up one level while a single click on the left button 113 slows text flow down one level. A click on the center button 112 while text is flowing stops the flow. From a stopped position, a single click on left button 113 moves the SRD to a queued state at the beginning of the current sentence. Additional single left clicks move back through the text, sentence-by-sentence. Once a new desired start location is found, a single click of center button 112 restarts the text flow, easing back up to speed. At all times there is a small progress indicator 109 below the text display box 108 that shows the reader's relative position within the entire text being read, as shown in FIGS. 1 and 3. Progress is indicated with this progress indicator 109 by black shading within an open horizontal bar.

Figure 2:
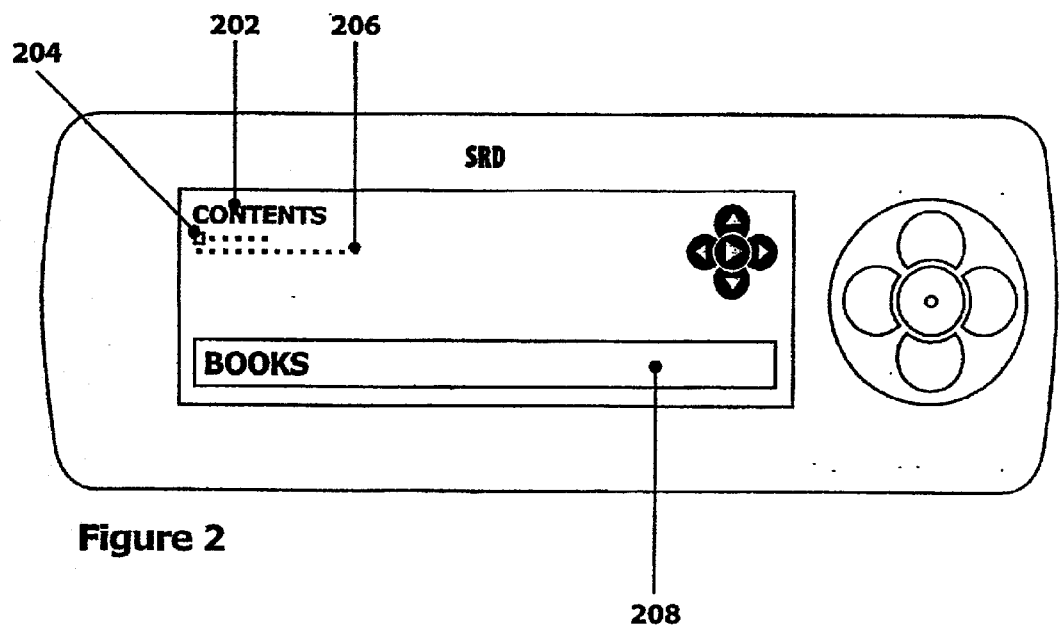
FIG. 2 shows a facing view of the SRD in Contents Mode at the Books position.

One of the major advantages of SRT is that it can be presented on very small screen sizes. This presents challenges in the area of file management and navigation. The SRD contains a new file navigation system that is extremely simple and powerful yet fully functional even on small screens. From the Reading mode, a press of the top button 114 puts the user into the Contents screen 202 at the home position as shown in FIG. 2. The file navigation system is designed to keep the user oriented and provide sufficient information to permit the user to move through the system, even though the screen size is very small.

The SRD file navigation system uses the familiar hierarchical structure of existing computer systems modified to represent it as a series of tiny dots 206 and icons 204. This is paired with a single text display box 208 that gives specific information about the highlighted item in the file structure. The first time the top button 114 is pressed, the SRD goes to the contents page with the open square "current location" icon 204 at the first position on the top of the file structure, as shown in FIG. 2. If a text is being read when top button 114 is pressed, the SRD goes to the Contents page 202 and highlights the current position in the text being read.

As indicated by the on-screen icons in the proxy 120 shown in FIG. 5, the top button 114 and bottom button 116 of the button pad 110 of the SRD move up and down respectively in the file structure and the left button 113 and right button 115 move left and right respectively. A click on the middle button 112 takes the user to the desired start point. FIG. 3 shows text as it is being read in the Reading mode. The SRT presents single words 302 in the text display box 108 of the SRD. All other controls and functions remain similar to those described in FIG. 1.

Figure 10:
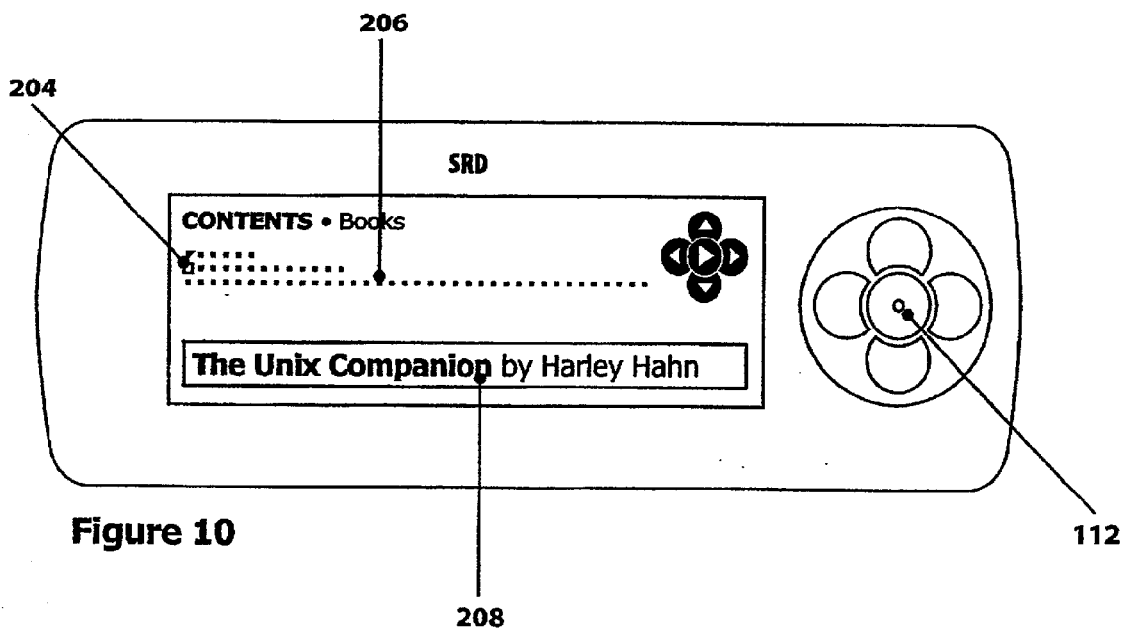
FIG. 10 shows a facing view of the SRD in the Contents Mode with the title page of the first stored text queued up.
Figure 11:
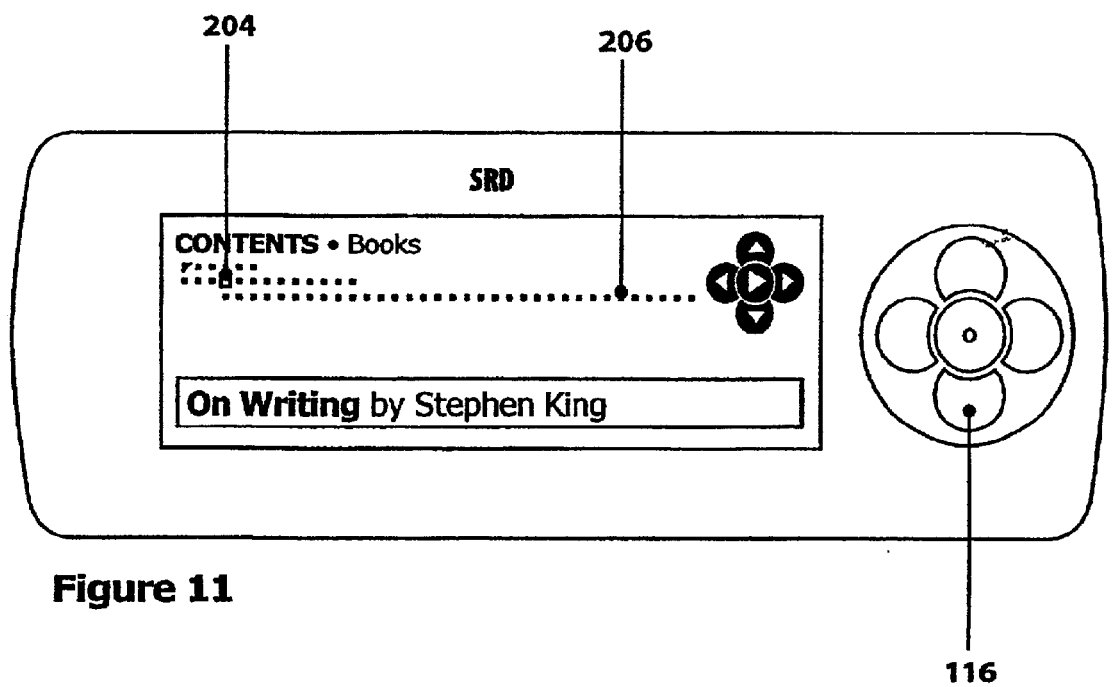
FIG. 11 shows a facing view of the SRD in the Contents Mode with the title page of the fourth stored text queued up.
Figure 12:
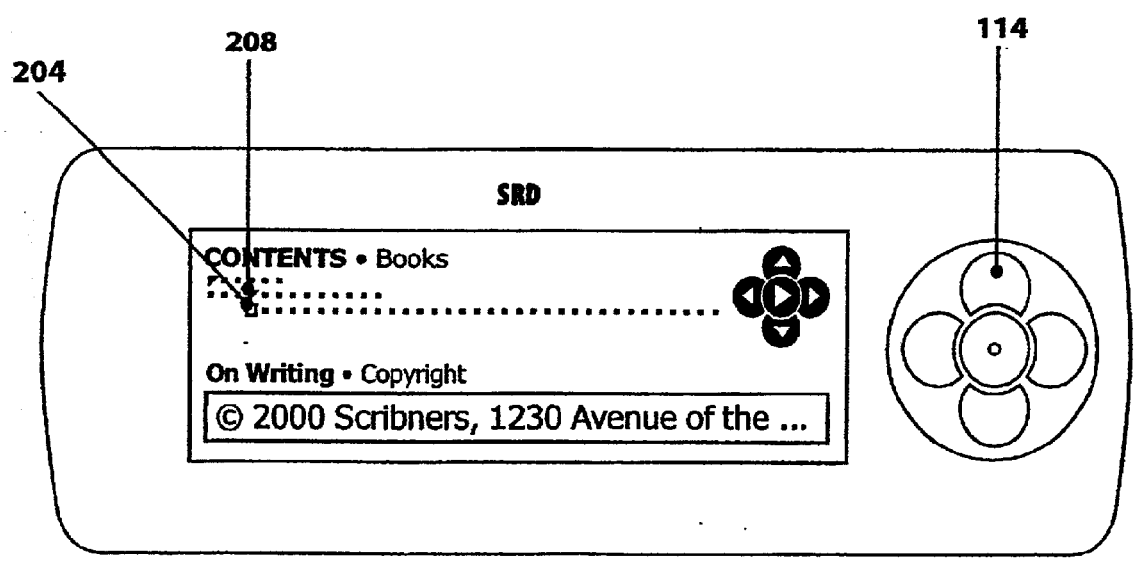
FIG. 12 shows a facing view of the SRD in the Contents Mode with the first text division (copyright information) of the fourth stored text queued up.
Figure 13:
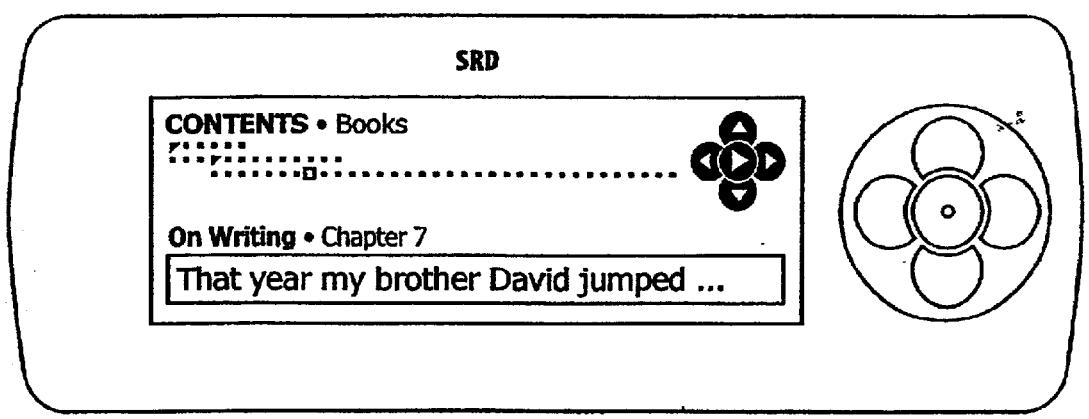
FIG. 13 shows a facing view of the SRD in the Contents Mode with the seventh chapter of the fourth stored text queued up.
Figure 14:
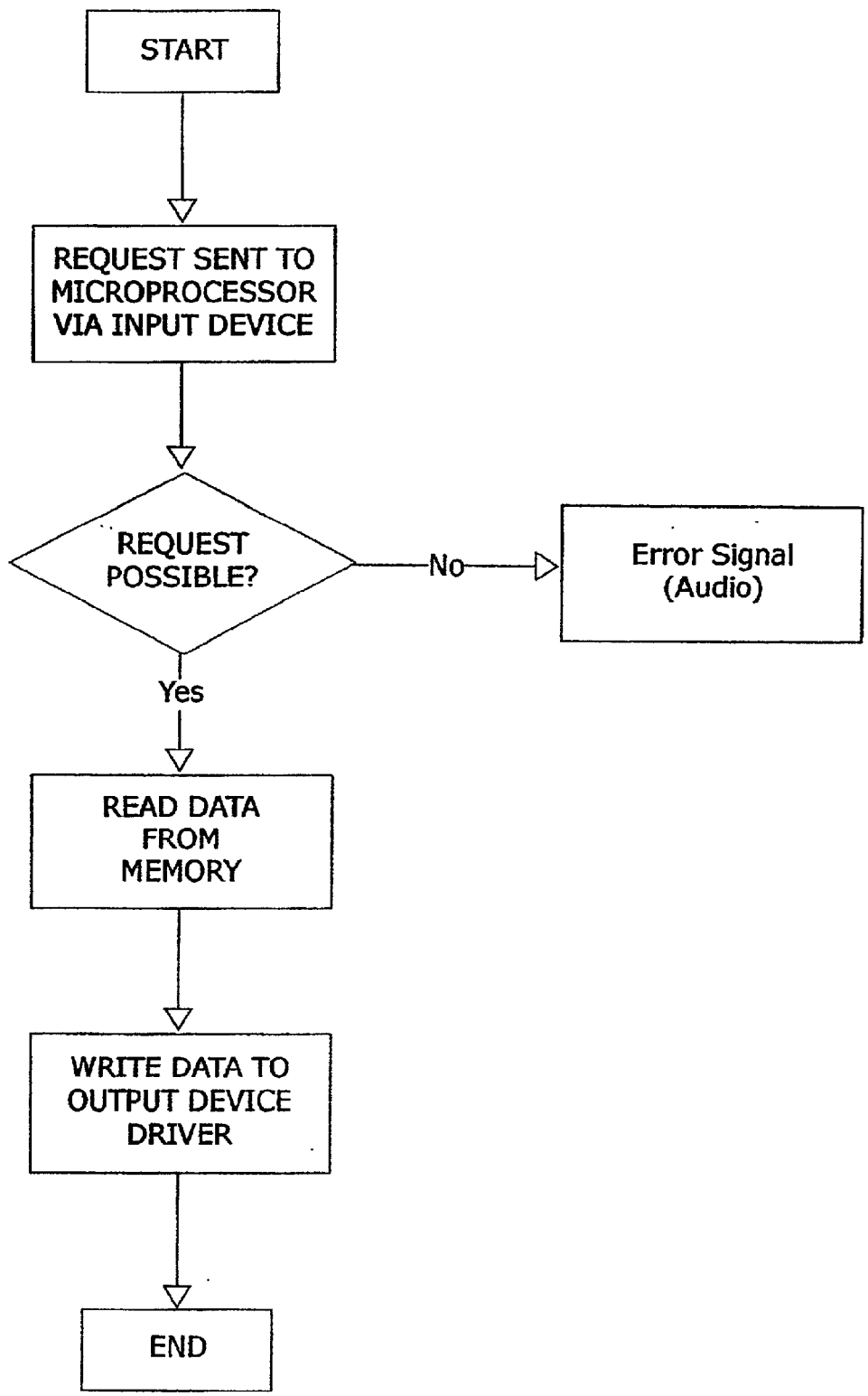
FIG. 14 is a flow diagram showing the software elements of the SRD and their interaction.
Figure 15:
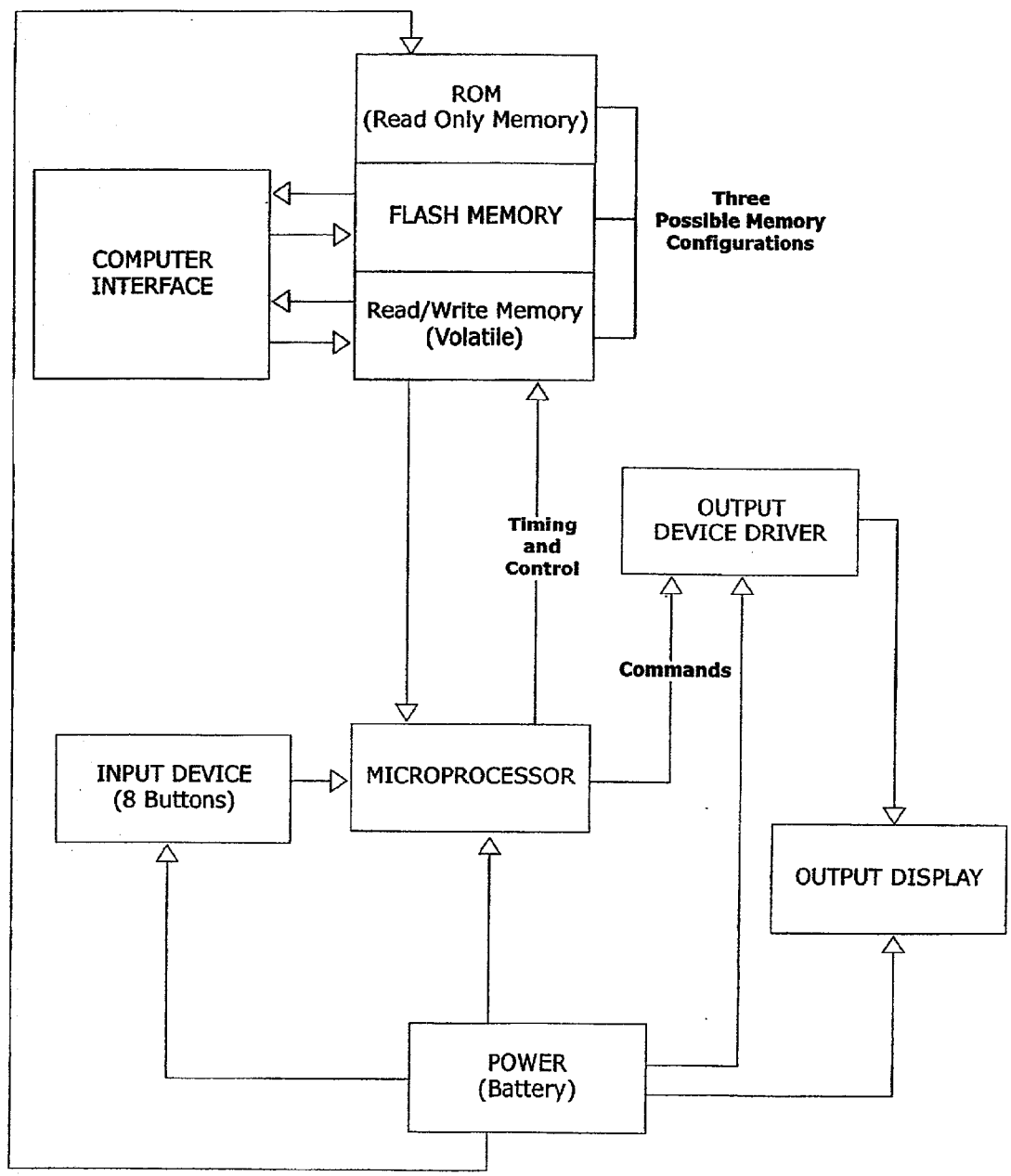
FIG. 15 is a flow diagram showing the hardware elements of the SRD and their interaction.

Once the user has entered the Contents Mode, a text selection can be made using the hierarchical structure. In FIG. 10, the first stored text is queued up to the title page and is ready for reading. With the cursor at this position, the user has three choices. 1) A single click of the middle button 112 moves the user to the Reading screen with this first text 208, in this example "'The Unix Companion' by Harley Hahn", queued up to be read from the beginning if this text has never been accessed before on this device. If the user has already accessed the file, it will queue up to the last used point in the text. 2) Moving the cursor 204 left and right within this row highlights a different uploaded text with its title shown in the display box as shown in FIG. 11. The next level of subdivision, typically chapters but possibly volumes or other commonly used divisions of books, magazines and other written works, is represented by a series of dots 206 at one dot per division down and to the right of the current position. 3) The user can click down using the bottom button 116 and then move left and right from chapter to chapter, with each chapter title or initial text shown in the text display box as shown in FIGS. 12 and 13. A small triangle icon 208, as shown in FIG. 12, indicates each branching point in the hierarchy. In the Contents mode, a click of the top button 114 always returns the current location cursor 204 to the branching point on the row above. Therefore, several quick clicks will always return the current location cursor 204 to the home row with the current category highlighted.

In any mode, pressing the top button 114 and holding it down for 3 seconds presents the user with the user settings screen. The on-screen proxy guides the user through these choices.

Figure 8:
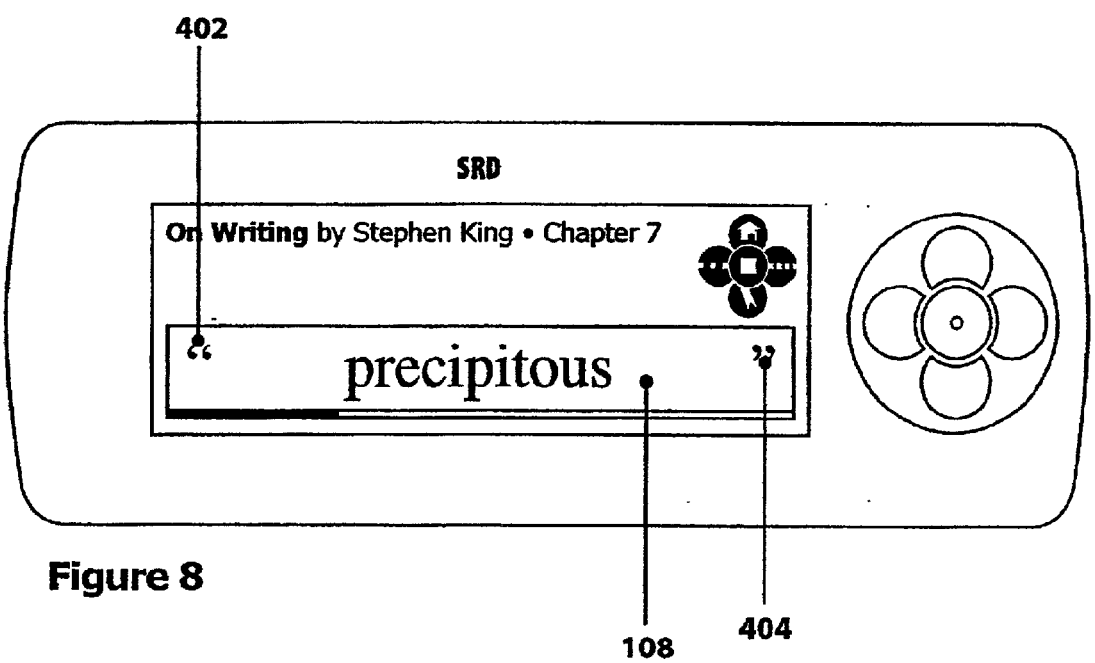
FIG. 8 shows a facing view of the SRD as it presents quoted text.
Figure 9:
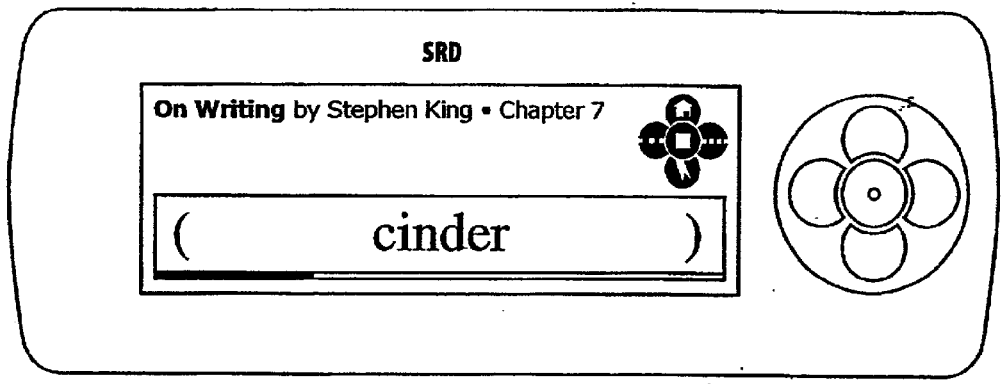
FIG. 9 shows a facing view of the SRD as it presents parenthetical text.

Several commonly used textual elements exist which must be displayed differently on the SRD than they are on normal text. These include quotation marks, parenthesis, brackets and dashes used to set off appositive phrases. As shown in FIG. 8, the SRD, on encountering the beginning of a quotation, places quotation marks 402, 404 at each end of the text display box 108, where they remain for the duration of the quote as it is displayed strobe text style. At the end of the quotation, both quotation marks disappear. Parenthetical text, as shown in FIG. 9, bracketed material (not shown) and appositive phrases set off by dashes (not shown) are likewise presented in this manner.

When the SRD encounters a footnote indicated in the text by various means such as an asterisk or a superscript numeral, the system pauses and asks whether the reader wishes to read the footnote as shown in FIG. 7. The reader uses the left and right buttons 113, 115 to answer no or yes respectively. In Footnote mode, the on-screen proxy 120 displays an X on left icon 121 and a check on right icon 123. If the user signals yes by a click on the right button, the SRD presents the footnote text then returns to the queued state in the main text at the beginning of the sentence containing the footnote. A no response moves the SRD directly to a queued state at the beginning of the sentence containing the footnote. This overlap helps the user remain oriented in the text. Once text flow begins again, the SRD ignores the footnote indicator on the second overlap pass.

The SRD remembers the current location of the play head when it powers off or when the user leaves the Reading mode to enter the Contents mode. Clicking the middle button 112 with a book title highlighted in the Contents mode, as shown in FIG. 10, will return to the last location used within that text. The reader can also place as many bookmarks as desired within a text and return to them at will or delete them. From any stopped location, the bookmark function can be entered by pressing the bottom button 116 as shown in FIG. 6, which in turn causes proxy 120 to change as shown in the Figure. In Bookmark mode, left icon 121 displays a back arrow, right icon 123 displays a forward arrow, top icon 122 displays a plus sign, and bottom icon 124 displays a minus sign. A bookmark is added by clicking on the top button 114. From a bookmarked, stopped position, a bookmark can be removed by clicking the bottom button 116. Using the back arrow/left button 121/113 and the forward arrow/right button 123/115, the reader can quickly navigate all bookmarked locations within a text. Each bookmarked location is a queued text state from which reading can be manipulated as usual by using the center button 112.

In the preferred embodiments, the SRD can be manufactured in several forms. The SRD can contain a serial connector similar to those used by Palm computing devices or IEEE 1394 high-speed digital interface connector similar to those used by digital video cameras. This device contains a hard drive and is attached to a PC using a serial or IEEE 1394 high-speed digital interface cable, and texts can be uploaded and deleted as the user desires. Appropriate software on the PC allows the user to do this easily and quickly.

The SRD can also be manufactured to use removable media such as the SONY Memory Stick or flash memory cards such as those currently used by MP3 players and digital cameras. The SRD is identical in nature to the serial-enabled or IEEE 1394 high-speed digital interface-enabled SRD above with the exception that removable media is used, allowing the storage of an unlimited number of texts. This embodiment also uses the PC connected by a serial or IEEE 1394 high-speed digital interface cable to add and delete texts.

Alternatively, the SRD can contain a fixed and predetermined number of uploaded texts. This version will have no outside connection so that new texts cannot be uploaded and existing texts cannot be copied or deleted.

In an alternate embodiment to the SRD hardware, the display screen is provided with brightness and illumination controls so that the user can adjust the brightness of the screen as desired.

Another alternate embodiment of the invention includes a detachable cover plate which is removably provided on the control panel so that the user is prevented from inadvertently activating the control panel while they are carrying the device and or reading a document. The cover plate can be optionally provided with a window which leaves one or more buttons of the control panel exposed when the cover plate is closed. For example, the window can be arranged to expose the left middle and right buttons. This allows the user to easily step up the speed of a document without having to open the cover plate to expose the entire control panel.

In another embodiment, the cover plate is arranged to cover the data storage/reading device. By this means the data storage/reading device can be protected from contamination by foreign matter, such as dust and sand, when the cover plate is closed.

At least a portion of the housing of the device is preferably covered with a resilient shock and impact absorbing material that also forms gripping portions. The material offers a non-slip easy-grip surface that allows the device to be easily and comfortably grasped by a user through extended periods of use, and simultaneously serves to provide shock and impact protection for the device.

Finally, an attachment point for a key chain or strap can be added to the SRD housing to improve the user's ability to carry and/or store the device, and a "hold" button can be added to temporarily disable all controls and avoid accidental button pushes while the SRD is not being used.

The preceding examples are provided for descriptive purposes solely and are not meant to limit the embodiments of the invention. Other configurations of the Strobe Reading Device and the Strobe Reading Technology will become apparent to those of ordinary skill in the art.

What is claimed is:

1. A method of displaying text on a screen of an electronic device comprising:
 a) presenting text as a single word display wherein said single word appears for a duration;
 b) clearing said single word to display no text, thereby creating a gap;
 c) repeating steps a) and b) until all desired text has been sequentially displayed;
wherein a speed of text display is created by repetition of said duration plus said gap; and
wherein varying said gap relative to said duration creates a different flow of text presentation, and wherein said gap is determined by the following formula: $G=S-(S/x)$, given that $D+G=S$, wherein D=duration, G=gap, S=speed, and x=a number in the range of 1.0–2.0.

2. The method of claim 1 wherein said speed is controllable by a user of said electronic device.

3. The method of claim 1, wherein x is about 1.5.

4. The method of claim 1, wherein when D is increased relative to G, text presentation becomes smooth but increasingly difficult to parse, and wherein the relationship of D to G is user controllable.

5. The method of claim 1, wherein when D is decreased relative to G, text presentation becomes choppy yet increasingly easy to parse.

6. The method of claim 1, wherein as a user alters said speed of said text display, an algorithm varies the duration of the gap relative to the speed.

7. The method of claim 1, further comprising presenting a punctuation mark selected from a group consisting essentially of a period, question mark, exclamation mark, comma, colon, and semicolon as a pause in timing of said text display.

8. The method of claim 7, wherein said pause in timing for commas, semicolons, and colons is about 2S, given that $S=D+G$, wherein S=speed, D=duration, and G=gap.

9. The method of claim 7, wherein said pause in timing for periods, questions marks, and exclamation marks is about 3S, given that S=D+G, wherein S=speed, D=duration, and G=gap.

10. The method of claim 1, wherein a paragraph break in text is presented as a pause in timing of said text display.

11. The method of claim 10, wherein said pause in timing for said paragraph break is about 4S, given that S=D+G, wherein S=speed, D=duration, and G=gap.

12. The method of claim 1, further comprising presenting punctuation marks that enclose text on said screen with said text, wherein when said marks are encountered in text, they are displayed until said enclosed text is completely displayed one word at a time on said screen.

13. The method of claim 12, wherein said punctuation marks that enclose text are selected from a group consisting essentially of parenthesis, quotation marks, brackets, and dashes.

14. The method of claim 1, further comprising presenting individual footnotes within text as a choice for a user, wherein when a footnote signal is encountered in text, an option is displayed on said screen giving said user the choice to view or not to view said footnote.

15. The method of claim 1, further comprising inserting at least one bookmark within said text.

16. The method of claim 15, wherein said at least one bookmark can be deleted.

17. The method of claim 1, further comprising presenting predetermined text at a reduced rate of speed.

18. The method of claim 17, wherein said reduced rate of speed is one-third the rate of speed of normal text.

19. The method of claim 17, wherein said predetermined text is underscored.

20. The method of claim 17, wherein said predetermined text is italicized.

21. A method for reducing the amount of eye movement when reading text from an electronic device, comprising:
   a) presenting text as a single word display wherein said single word appears for a duration;
   b) clearing said single word to display no text, thereby creating a gap;
   d) repeating steps a) and b) until all desired text has been sequentially displayed;
wherein a speed of text display is created by repetition of said duration plus said gap; and
wherein varying said gap relative to said duration creates a different flow of text presentation, and wherein said gap is determined by the following formula: G=S−(S/x), given that D+G=S, wherein D=duration, G=gap, S=speed, and x=a number in the range of 1.0–2.0.

22. A method of displaying text on a screen of an electronic device comprising:
   a) presenting text as a single display for a predetermined duration of time;
   b) clearing said single display to display no text, thereby creating a gap;
   e) repeating steps a) and b) until all desired text has been sequentially displayed;
wherein a speed of text display is created by repetition of said duration plus said gap, said gap being determined by the formula: $G=S-(S/x)$, given that $D+G=S$,
wherein D=duration, G=gap, S=speed, and x=a number in the range of 1.0–2.0.

23. The method of claim 22, wherein said speed is controllable by a user of said electronic device and wherein x is from about 1.3 to about 1.7.

24. The method of claim 22 wherein x is from about 1.4 to about 1.6.

25. The method of claim 22, wherein D is selected relative to G to optimize the smoothness of text presentation.

26. The method of claim 22, wherein D is selected relative to G to optimize the ease of parsing text presentation.

27. The method of claim 25, wherein D is user adjustable relative to G, whereby the smoothness of text presentation relative to ease of text parsing is user selectable.

28. The method of claim 22, wherein as a user alters said speed of said text display, an algorithm varies the duration of the gap relative to the speed.

29. The method of claim 22, further comprising presenting a punctuation mark selected from a group consisting essentially of a period, question mark, exclamation mark, comma, colon, and semicolon as a pause in timing of said text display.

30. The method of claim 22, further comprising presenting punctuation marks that enclose text on said screen with said text, wherein when said marks are encountered in text, they are displayed until said enclosed text is completely displayed one word at a time on said screen.

31. The method of claim 30, wherein said punctuation marks that enclose text are selected from a group consisting essentially of parenthesis, quotation marks, brackets, and dashes.

32. The method of claim 22, further comprising presenting individual footnotes within text as a choice for a user, wherein when a footnote signal is encountered in text, an option is displayed on said screen giving said user the choice to view or not to view said footnote.

33. The method of claim 22, further comprising inserting at least one bookmark within said text.

34. The method of claim 33, wherein said at least one bookmark can be deleted.

35. The method of claim 22, further comprising presenting predetermined text at a reduced rate of speed.

36. The method of claim 35, wherein said reduced rate of speed is one-third the rate of speed of normal text.

37. The method of claim 35, wherein said predetermined text is underscored.

38. The method of claim 35, wherein said predetermined text is italicized.

* * * * *